United States Patent [19]

Peres

[11] 4,251,917

[45] Feb. 24, 1981

[54] PORTABLE DRUM OPENER

[75] Inventor: Anthony R. Peres, Canandaigua, N.Y.

[73] Assignee: Peres Machines Division Honeoye Industries, Inc., Honeoye, N.Y.

[21] Appl. No.: 12,239

[22] Filed: Feb. 14, 1979

[51] Int. Cl.[3] ............................................ B23Q 17/00

[52] U.S. Cl. ........................................ 30/403; 30/417; 30/421; 30/434; 82/48; 82/71; 82/76

[58] Field of Search ................. 82/48, 71, 76, 97, 100; 30/405, 418, 421, 424, 425, 426, 403, 404, 433, 434, 417

[56] References Cited

U.S. PATENT DOCUMENTS

| | | | |
|---|---|---|---|
| 2,484,504 | 10/1949 | Hanby | 30/421 |
| 2,603,857 | 7/1952 | Hanby | 30/405 |
| 2,886,887 | 5/1959 | Krist et al. | 30/425 |
| 3,006,070 | 10/1961 | Nordquist | 30/424 |
| 3,110,962 | 11/1963 | Krist et al. | 30/418 |
| 3,161,952 | 12/1964 | Czapiewski | 30/425 |
| 3,667,120 | 6/1972 | Krist | 30/425 |

*Primary Examiner*—Leonidas Vlachos
*Attorney, Agent, or Firm*—Stonebraker, Shepard & Stephens

[57] ABSTRACT

A portable drum opener tracks around a cover rim of a drum while cutting through an outer lip of the cover rim. It includes a rotatably driven drive wheel for engaging a radially inward facing surface of the cover rim for advancing the opener around the drum. A shaft that is movable toward and away from the outer lip of the cover rim carries a cutter wheel for pressing against and cutting through the outer lip in a region opposite the drive wheel. A pair of guide wheels are mounted for rolling against the outer lip of the cover on opposite sides of the drive wheel to support the opener during cutting, and a spring biased bracket urges the guide rollers against the outer lip of the cover. A lost motion coupling between the movable shaft and the guide roller bracket lets the guide rollers press independently against the drum rim during the cut but retracts the guide rollers away from the cutter rim when the cutter is retracted at the end of a cut.

8 Claims, 3 Drawing Figures

PORTABLE DRUM OPENER

BACKGROUND OF THE INVENTION

U.S. Pat. Nos. 3,739,472 and 3,898,898 best represent the state-of-the-art of drum openers, especially as used in the food processing industry. The devices of these patents rotate the drums to be opened and press a cutter against the drum cover, preferably so as to cut along the outer lip or chime of the drum cover, to cut the cover loose from the drum wall so that it can be removed without getting any metal fragments inside the drum. Although devices according to these patents are effective and widely used, they are generally operated in a single location, are relatively expensive, and require movement of drums to and away from the opener.

There is also a need for a portable drum opener that is smaller, light enough to be readily moved about and used in different locations, and still strong and reliable enough to open drums by the preferred method of cutting through the drum chime along the outer lip of the cover. The invention both recognizes this need and provides a portable drum opener meeting all the requirements and being economical, light enough to be easily lifted and positioned by a single worker, movable to different locations, and reliable and durable in operation.

SUMMARY OF THE INVENTION

The inventive portable drum opener tracks around a cover rim of a drum while cutting through an outer lip of the cover rim. It includes a drive wheel for engaging a radially inward facing surface of the cover rim and means for rotating the drive wheel for advancing the opener around the cover rim. A shaft that is movable toward and away from the outer lip of the cover rim carries a cutter wheel for pressing against and cutting through the outer lip in a region opposite the drive wheel. A pair of guide wheels are mounted for rolling against the outer lip of the cover on opposite sides of the drive wheel, and the guide wheels support the opener in tracking around the cover rim. Spring means are arranged for biasing the guide rollers against the outer lip of the cover, and a coupling between the movable shaft bearing the cutter and the spring means for biasing the guide rollers are arranged for moving the guide rollers away from the outer lip against the bias of the spring means when the shaft is moved away from the outer lip and for releasing the spring means for biasing the guide rollers against the outer lip when the shaft moves toward the outer lip. This allows the opener to be manually raised and lowered from the cover rim while the cutter and guide rollers are retracted or moved away from the drive wheel.

DRAWINGS

FIGS. 1 and 2 are partially schematic side elevational views of a preferred embodiment of the inventive portable drum opener with the cutter and guide rollers retracted in FIG. 1 and in working position in FIG. 2; and FIG. 3 is a fragmentary cross-sectional view of the drum opener of FIG. 2 taken along the line 3—3 thereof.

DETAILED DESCRIPTION

Figure 1:
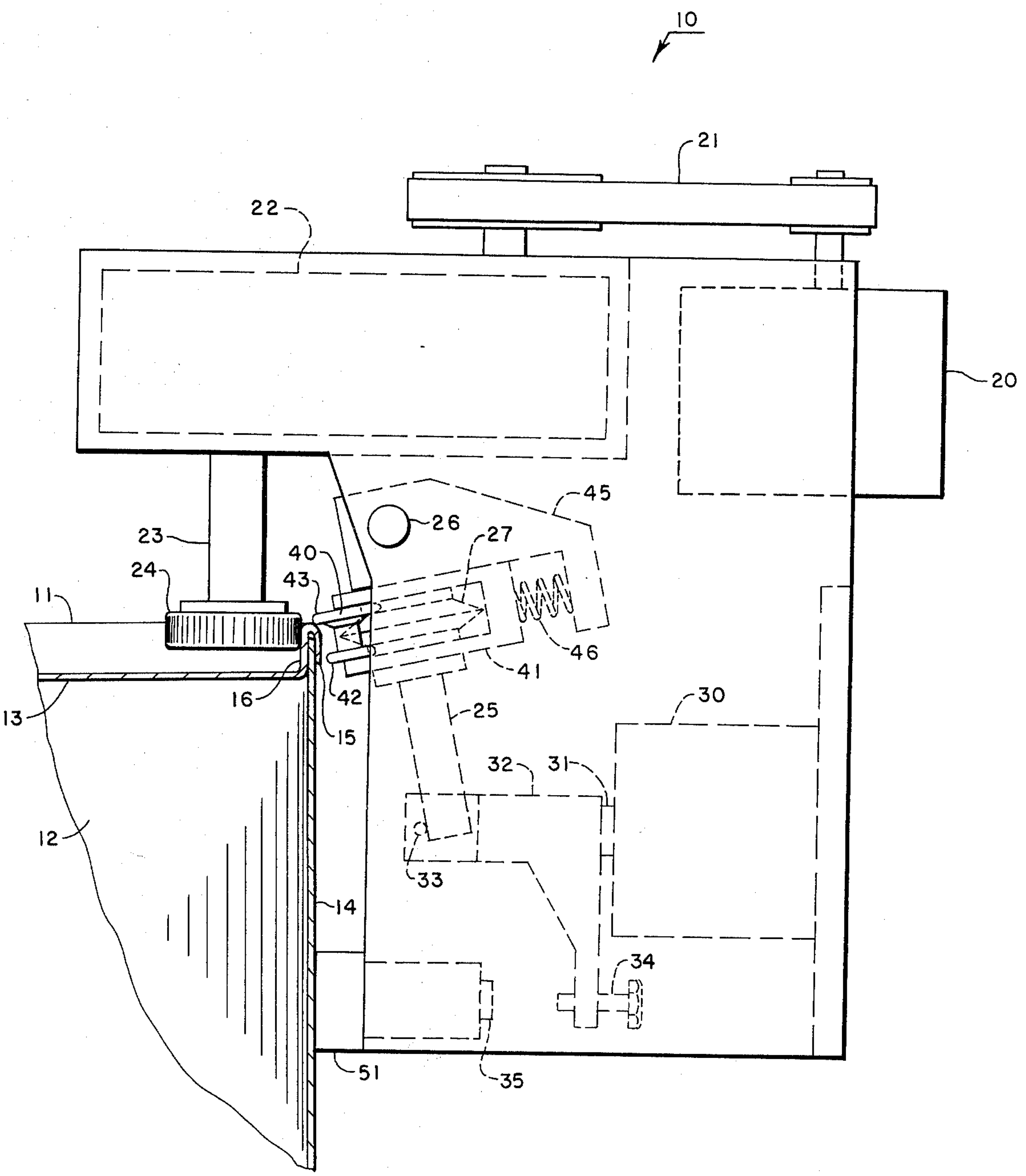

Drum opener 10 tracks around rim 11 of drum 12 while drum 12 stands still on a floor, and opener 10 normally circles drum 12 several times before completing a cut. Opener 10 is also schematically illustrated in a simplified form that omits elements such as a lifting handle and pneumatic connections to a source of pressurized air for powering opener 10.

The rim 11 of cover 13 of drum 12 is bent around the end of drum wall 14 to form a chime having an outer lip 15 extending around cover rim 11 on the outside of drum wall 14. Opener 10 preferably cuts through outer lip 15 of cover rim 11 to sever cover 13 from drum 12 without any chance of getting metal fragments inside drum 12.

An air motor 20 powers opener 10 for tracking around cover rim 11 by driving through belt 21 and transmission 22 to turn shaft 23 bearing drive wheel 24. Drive wheel 24 is preferably knurled or has a roughened surface for engaging a radially inward facing surface 16 of cover rim 11 and advancing opener 10 around cover rim 11 as drive wheel 24 turns.

Figure 2:
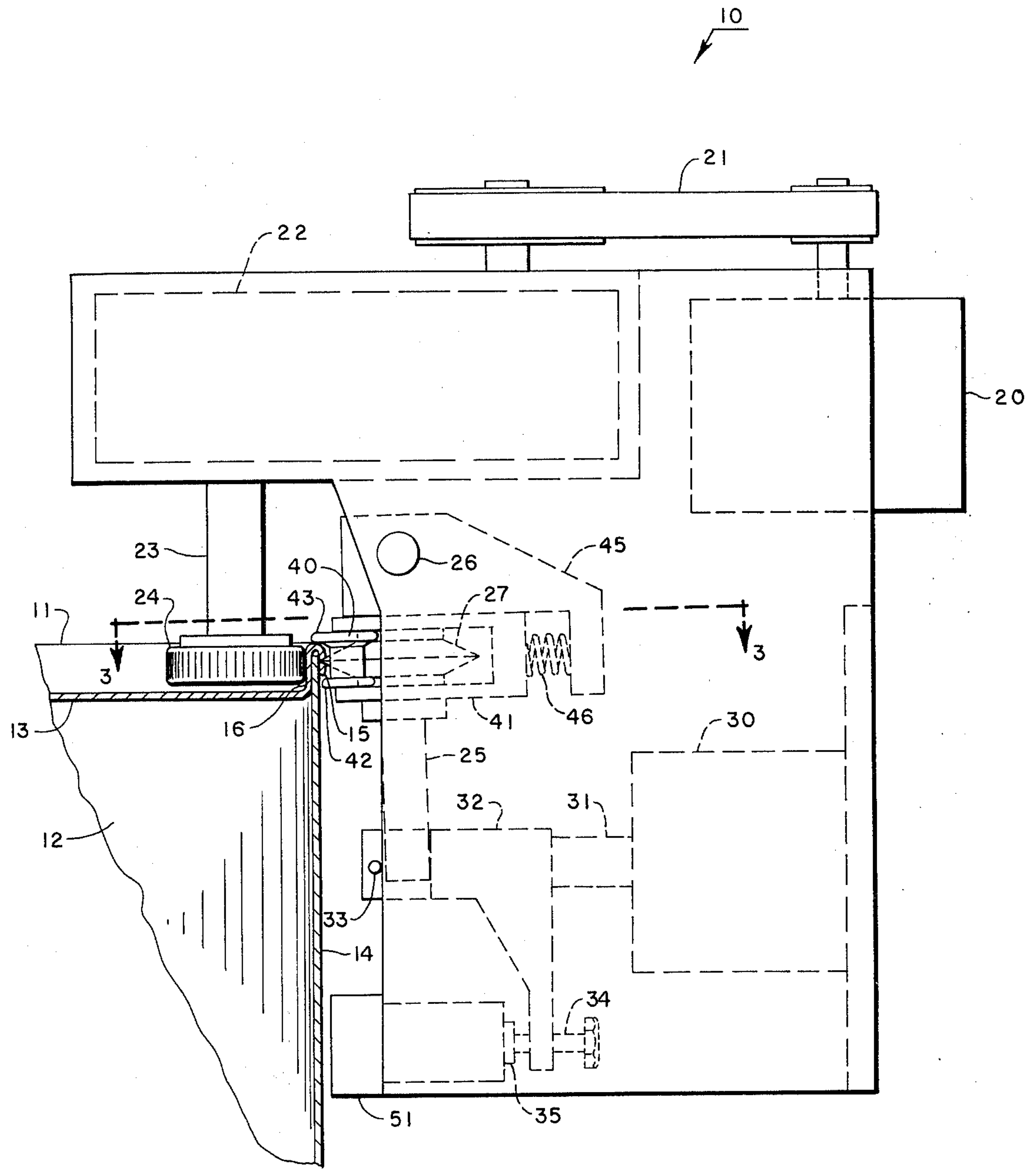

A shaft 25 is mounted for vertical swinging motion on a generally horizontal pivot pin 26, and a cutter wheel 27 is freely rotatable on shaft 25 for cutting through outer lip 15 of cover rim 11 as opener 10 tracks around drum 12. A guide roller bracket device is also pivotally mounted on pin 26 to be movable relative to cover rim 11 as explained more fully below. Shaft 25 is shown retracted from drum 12 in FIG. 1 and urged toward drum 12 in FIG. 2, and pivoting of shaft 25 between the positions of FIGS. 1 and 2 is controlled by air cylinder 30 that pneumatically positions shaft 31. A bracket 32 on shaft 31 engages a lower end of shaft 25 and presses shaft 25 toward drum 12 using the force applied by air cylinder 30 to drive cutter 27 progressively deeper into outer lip 15 of cover rim 11 as opener 10 tracks around drum 12. A pin 33 in the outer end of bracket 32 engages the opposite side of shaft 25 as shown in FIG. 1 for retracting shaft 25 away from drum 12 under power supplied by air cylinder 30. This pulls cutter 27 away from cutter rim 11 so that opener 10 can be placed on or removed from a drum.

A screw 34 is adjustable relative to bracket 32 for engaging a switch 35 to stop the operation of opener 10 when cutter 27 has cut all the way through outer lip 15 of cover rim 11. Adjustment of screw 34 allows the opener to be shut off when the cut is completed, even thought this will occur at different positions of shaft 25 as cutter 27 wears down from use and successive sharpenings.

Figure 3:
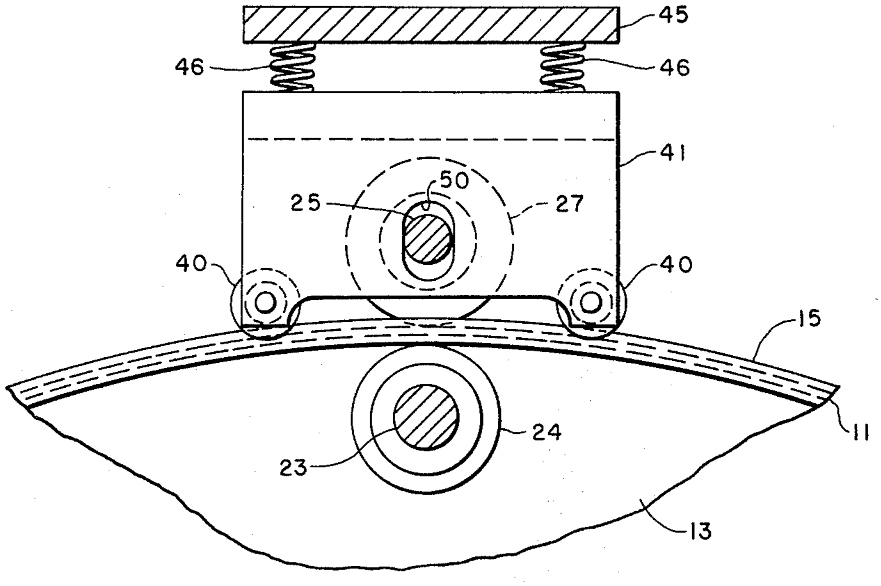

A pair of guide rollers 40 are mounted on a bracket 41 for rotating freely against outer lip 15 on opposite sides of drive wheel 24 and cutter 27 as best shown in FIG. 3. Guide rollers 40 have lower flanges 42 for fitting under the lower edge of outer lip 15 and radially larger upper flanges 43 for bearing against the top of cover rim 11 as best shown in FIGS. 1 and 2.

An abutment element 45 that is pivotally mounted on pin 26 supports a pair of springs 46 that bias bracket 41 toward cover rim 11 for urging guide rollers 40 against outer lip 15. Bracket 41 is slightly rotatable around the generally vertical axis of shaft 25 so that both guide rollers 40 bear securely against outer lip 15 as opener 10 tracks around rim 11.

Bracket 41 has an oblong slot 50 through which shaft 25 passes for a lost motion coupling between shaft 25 and bracket 41. When shaft 25 is urged toward outer lip 15 by air cylinder 30 to press cutter 27 against outer lip 15, shaft 25 is in a mid-position in oblong slot 50 as shown in FIG. 3; and guide rollers 40 are urged against cover rim 11 by springs 46 independently of the force applied to cutter wheel 27 by air cylinder 30. This gives guide rollers 40 a spring bias pressure against cover rim 11 and supports opener 10 for tracking around rim 11 by the three point engagement of guide rollers 40 on opposite sides of drive wheel 24.

When shaft 25 is retracted as shown in FIG. 1 to clear cutter 27 from cover rim 11, shaft 25 moves against an end of oblong slot 50 and pulls bracket 41 away from cover rim 11 so that guide rollers 40 also retract from outer lip 15. The larger upper flanges 43 of guide rollers 40 have a large enough diameter to rest on the top of cover rim 11 in a fully retracted position as shown in FIG. 1 to help support opener 10 on top of cover rim 11. In this position, a skid bar 51 below guide rollers 40 engages side wall 14 of drum 12 to help hold opener 10 in place.

As shaft 25 moves toward drum 12 and cutter 27 cuts progressively deeper into outer lip 15, abutment 45 is moved progressively closer to cover rim 11 along with shaft 25 as shown in FIG. 2 to compress bias springs 46 and urge guide rollers 40 firmly into engagement with outer lip 15. Shaft 25 does not move so far in slot 50 as to engage the forward end of slot 50 closest to cover rim 11.

In the shutoff position, the working components of opener 10 are in the position shown in FIG. 1 so that opener 10 can be raised and lowered relative to a drum cover 13. After opener 10 is set in the position of FIG. 1, it is started in an operation cycle in which air motor 20 advances drive wheel 24 and air cylinder 30 presses shaft 25 toward cover rim 11, as shown in FIG. 2. In this position, opener 10 tracks around cover rim 11 and cutter 27 works progressively deeper into a cut made in outer lip 15 as guide rollers 40 press against outer lip 15 under the bias of springs 46. When outer lip 15 is cut all the way through, screw 34 engages switch 35 and shuts off opener 10 to retract shaft 25 back to the position shown in FIG. 1 to clear cutter 27 and guide rollers 40 from cover rim 11. Opener 10 can then be lifted off drum 12 and moved to another drum for making a successive cut.

Opener 10 is light enough to be lifted by a single worker and portable enough to be taken to wherever drums need to be opened. It requires only a pneumatic power supply and sufficient clearance to track around a cover rim of a drum. It also is durable and reliable and tracks accurately around a drum even though the rim or side wall may be dented or irregular.

I claim:

1. A portable drum opener for tracking around a cover rim of a drum while cutting through an outer lip of said cover rim, said opener including a drive wheel for engaging a radially inward facing surface of said cover rim and advancing said opener around said cover rim, and said opener comprising:

a. a pivot vertically and laterally spaced from said drive wheel;

b. an assembly including a guide roller bracket, a spring support element, and a generally vertically oriented idler shaft mounted on said pivot for generally horizontal movement;

c. a cutter wheel mounted on said idler shaft to be pivotally movable toward and away from said outer lip of said cover rim;

d. means for moving said idler shaft to press said cutter wheel against said outer lip in a region opposite said drive wheel;

e. a pair of guide rollers arranged on generally vertical axes on said guide roller bracket for rolling against said outer lip on opposite sides of said drive wheel and said cutter wheel to support said opener in tracking around said cover rim;

f. spring means arranged between said guide roller bracket and said spring support element for biasing said guide rollers against said outer lip; and g. a lost motion coupling between said idler shaft and said guide roller bracket for moving said guide rollers away from said outer lip against the bias of said spring means when said idler shaft is pivoted away from said outer lip and for releasing said spring means for biasing said guide rollers against said outer lip when said idler shaft pivots toward said outer lip.

2. The drum opener of claim 1 including a shutoff switch device having an element movable with said idler shaft for shutting off said drum opener when said cutter wheel reaches a predetermined depth of cut into said outer lip.

3. The drum opener of claim 1 including a brace disposed to engage said drum below said outer lip for bracing said opener on said drum whenever said guide rollers are moved away from said outer lip.

4. The drum opener of claim 1 wherein said guide rollers have upper flanges disposed to engage the top of said cover rim and support said opener on said cover rim.

5. The drum opener of claim 1 wherein said guide roller bracket has an oblong slot, and said idler shaft extends through said slot to form said lost motion coupling.

6. The drum opener of claim 5 including a shutoff switch device having an element movable with said idler shaft for shutting off said drum opener when said cutter wheel reaches a predetermined depth of cut into said outer lip.

7. The drum opener of claim 6 including a brace disposed to engage said drum below said outer lip for bracing said opener on said drum whenever said guide rollers are moved away from said outer lip.

8. The drum opener of claim 7 wherein said guide rollers have upper flanges disposed to engage the top of said cover rim and support said opener on said cover rim.

* * * * *